US012619258B2

(12) United States Patent
Vasavada et al.

(10) Patent No.: US 12,619,258 B2

(45) Date of Patent: May 5, 2026

(54) SYSTEMS AND METHODS FOR AIRCRAFT LANDING GUIDANCE DURING GNSS DENIED ENVIRONMENT

(71) Applicant: Honeywell International Inc., Charlotte, NC (US)

(72) Inventors: Arpan Vasavada, Ujjain (IN); R Harsha Niyogi, Bangalore (IN); Chiranjeevi Kamireddy, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 17 days.

(21) Appl. No.: 18/602,942

(22) Filed: Mar. 12, 2024

(65) Prior Publication Data

US 2025/0231571 A1 Jul. 17, 2025

(30) Foreign Application Priority Data

Jan. 11, 2024 (IN) .............................. 202411002069

(51) Int. Cl.
　　*G05D 1/654* (2024.01)
　　*B64D 45/08* (2006.01)
　　　　(Continued)

(52) U.S. Cl.
　　CPC ............. *G05D 1/654* (2024.01); *B64D 45/08* (2013.01); *G05D 1/242* (2024.01); *G05D 1/243* (2024.01);
　　　　(Continued)

(58) Field of Classification Search
　　CPC ...... B60W 30/02; B60W 10/18; B60W 10/20; B60W 10/26; B60W 20/15; B60W 50/14;
　　　　(Continued)

(56) References Cited

U.S. PATENT DOCUMENTS

| | | | |
|---|---|---|---|
| 9,939,524 B2 | 4/2018 | Winstead | |
| 10,488,512 B1 | 11/2019 | Pounds | |

(Continued)

FOREIGN PATENT DOCUMENTS

| | | |
|---|---|---|
| CN | 107703759 A | 5/2020 |
| CN | 111649737 A | 9/2020 |

(Continued)

OTHER PUBLICATIONS

Doer et al., "Radar Based Autonomous Precision Takeoff and Landing System for VTOLs in GNSS Denied Environments", 2020 International Conference on Unmanned Aircraft Systems (ICUAS) Athens, Greece, Sep. 1-4, 2020, pp. 922 through 931.

(Continued)

*Primary Examiner* — Rami Khatib

(74) *Attorney, Agent, or Firm* — Fogg & Powers LLC

(57) ABSTRACT

A system comprises a GNSS sensor onboard an aerial vehicle; a monitor warning system (MWS) that determines whether the vehicle is in a GNSS denied environment; and a flight management system that includes a landing guidance module, and a database having location coordinates of landing sites. Onboard vision sensors and a radar velocity system (RVS) communicate with the guidance module. When the MWS determines that the vehicle is in a GNSS denied environment, the guidance module calculates an optimal flight path by receiving image data from the vision sensors; receiving position, velocity and altitude data from the RVS; receiving location coordinates of a landing site; processing the image data, and the position, velocity and altitude data, to determine a location of the vehicle and provide 3D imaging of a route to the landing site; and calculating a flight path angle to the landing site, using vehicle and landing site coordinates.

11 Claims, 10 Drawing Sheets

(51) Int. Cl.

| | |
|---|---|
| *G05D 1/242* | (2024.01) |
| *G05D 1/243* | (2024.01) |
| *G05D 1/245* | (2024.01) |
| *G05D 1/248* | (2024.01) |
| *G05D 109/20* | (2024.01) |
| *G05D 111/10* | (2024.01) |
| *G05D 111/30* | (2024.01) |
| *G05D 111/50* | (2024.01) |

(52) U.S. Cl.
CPC ............. *G05D 1/245* (2024.01); *G05D 1/248* (2024.01); *G05D 2109/20* (2024.01); *G05D 2111/10* (2024.01); *G05D 2111/30* (2024.01); *G05D 2111/52* (2024.01)

(58) Field of Classification Search
CPC ..... B60W 2050/146; B60W 2510/246; B60W 2552/35; B60W 2552/40; F02D 1/00
See application file for complete search history.

(56) References Cited

U.S. PATENT DOCUMENTS

| | | | |
|---|---|---|---|
| 10,677,916 B2 | 6/2020 | Laplace et al. | |
| 2016/0012289 A1* | 1/2016 | Petit ......................... | G06T 7/60 |
| | | | 348/144 |
| 2020/0341117 A1* | 10/2020 | Sandford ................ | G01S 17/93 |
| 2021/0264798 A1* | 8/2021 | B ............................. | G08G 5/21 |

| | | | |
|---|---|---|---|
| 2021/0319709 A1 | 10/2021 | Rose et al. | |
| 2021/0405654 A1 | 12/2021 | Ulun et al. | |
| 2023/0045232 A1* | 2/2023 | Enda ........................ | G01S 19/15 |
| 2023/0105148 A1* | 4/2023 | Ophir ....................... | G08G 5/80 |
| | | | 701/16 |
| 2023/0117700 A1 | 4/2023 | Auillans et al. | |
| 2023/0237915 A1* | 7/2023 | Mizumoto ............... | G08G 5/22 |
| | | | 701/3 |
| 2024/0194081 A1* | 6/2024 | Hammond ............. | B64U 10/14 |
| 2025/0054175 A1* | 2/2025 | Bowman .................. | G06T 7/75 |

FOREIGN PATENT DOCUMENTS

| | | |
|---|---|---|
| CN | 113359782 B | 7/2022 |
| CN | 112347840 B | 12/2022 |
| CN | 116380057 A | 8/2023 |
| GB | 2172462 A | 9/1986 |
| WO | 2021038485 A1 | 3/2021 |

OTHER PUBLICATIONS

European Patent Office, "Extended European Search Report", dated May 28, 2025, from EP Application No. 24221507.7, from Foreign Counterpart to U.S. Appl. No. 18/602,942, pp. 1 through 12, Published: EP.

Wei et al., "Autonomous Navigation for eVTOL: Review and Future Perspectives", IEEE Transactions on Intelligent Vehicles, vol. 9, No. 2, Feb. 2024, pp. 4145 through 4171.

* cited by examiner

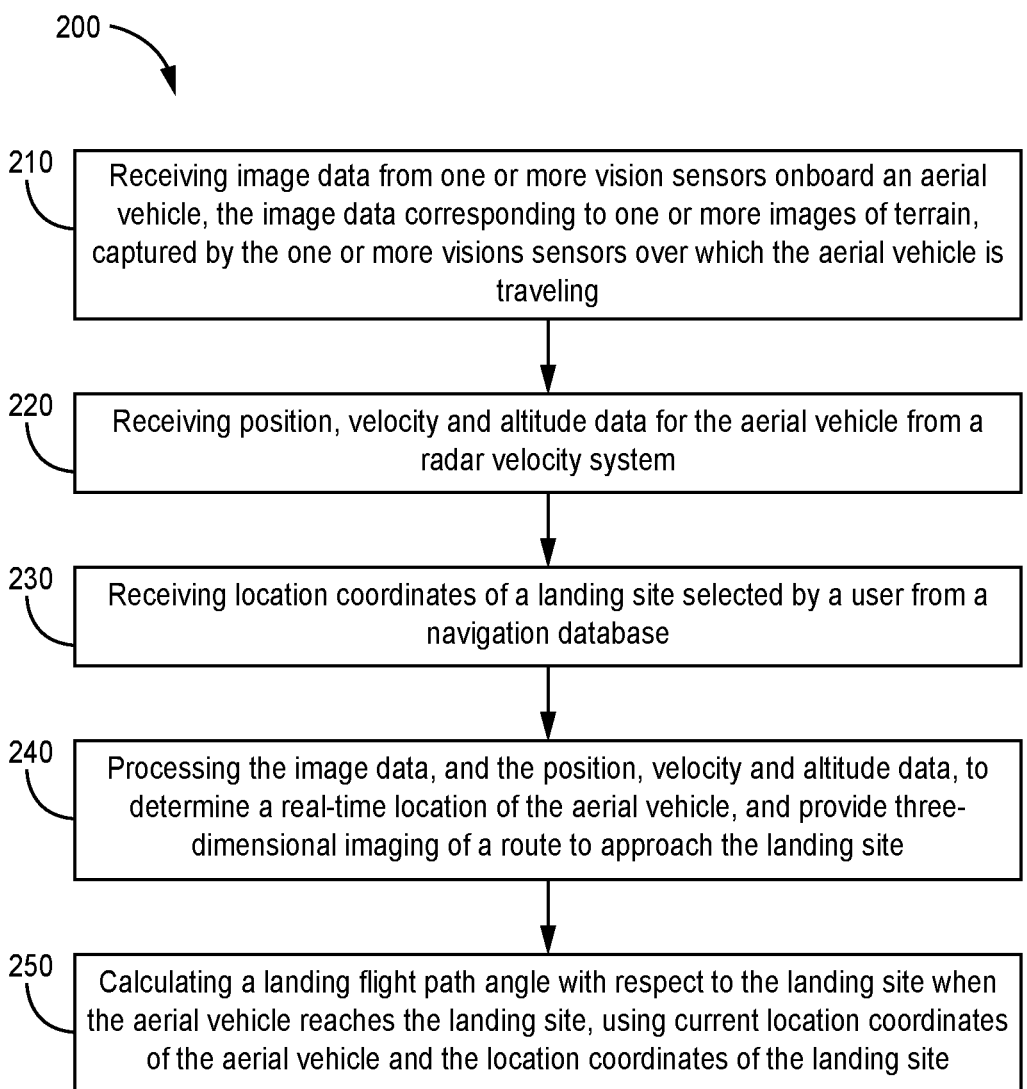

200

210    Receiving image data from one or more vision sensors onboard an aerial vehicle, the image data corresponding to one or more images of terrain, captured by the one or more visions sensors over which the aerial vehicle is traveling 220    Receiving position, velocity and altitude data for the aerial vehicle from a radar velocity system 230    Receiving location coordinates of a landing site selected by a user from a navigation database 240    Processing the image data, and the position, velocity and altitude data, to determine a real-time location of the aerial vehicle, and provide three-dimensional imaging of a route to approach the landing site 250    Calculating a landing flight path angle with respect to the landing site when the aerial vehicle reaches the landing site, using current location coordinates of the aerial vehicle and the location coordinates of the landing site

FIG. 2

SYSTEMS AND METHODS FOR AIRCRAFT LANDING GUIDANCE DURING GNSS DENIED ENVIRONMENT

CROSS-REFERENCE TO RELATED APPLICATION

This application claims priority to Indian Provisional Application No. 202411002069, filed on Jan. 11, 2024, the contents of which is incorporated herein by reference.

BACKGROUND

The landing phase of an aircraft is a critical phase of flight, and controlling attitude during the landing phase is essential to a successful landing. For manual flight of an aircraft, a pilot controls the attitude with manual controls. During an automatic landing of an aircraft, an onboard autopilot system controls the attitude.

Global navigation satellite system (GNSS) sensors on aircraft, such as global positioning system (GPS) sensors, provide landing guidance in the form of distance to land the aircraft, direction and location of the aircraft, and the like, for automatic landing or a piloted landing of the aircraft. When the aircraft is in a GNSS denied environment, it is difficult to land the aircraft safely at a landing site as various parameters, such as distance, direction, location, and other parameters are absent.

SUMMARY

A system comprises a global navigation satellite system (GNSS) sensor onboard an aerial vehicle; a monitor warning system in operative communication with the GNSS sensor, the monitor warning system operative to determine whether the aerial vehicle is in a GNSS denied environment; and a flight management system onboard the aerial vehicle, the flight management system including at least one processor that hosts a landing guidance module, and a navigation database that includes location coordinates of one or more landing sites. One or more vision sensors mounted on the aerial vehicle are in operative communication with the landing guidance module. A radar velocity system (RVS) onboard the aerial vehicle is in operative communication with the landing guidance module. An inertial navigation system onboard the aerial vehicle is in operative communication with the RVS. When the monitor warning system determines that the aerial vehicle is located in a GNSS denied environment, the landing guidance module is activated and is operative to calculate an optimal flight path by a process that comprises: receive image data from the one or more vision sensors, the image data corresponding to one or more terrain images over which the aerial vehicle is traveling; receive position, velocity and altitude data for the aerial vehicle from the RVS; receive location coordinates of a landing site selected by a user from the navigation database; process the image data, and the position, velocity and altitude data, to determine a real time location of the aerial vehicle and provide three-dimensional imaging of a route to the landing site; and calculate a landing flight path angle with respect to the landing site when the aerial vehicle reaches the landing site, using current location coordinates of the aerial vehicle and the location coordinates of the landing site.

BRIEF DESCRIPTION OF THE DRAWINGS

Aspects of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 2 is a flow diagram of an operational method performed by a landing guidance module for an aerial vehicle, according to an exemplary implementation;

DETAILED DESCRIPTION

Figure 1:
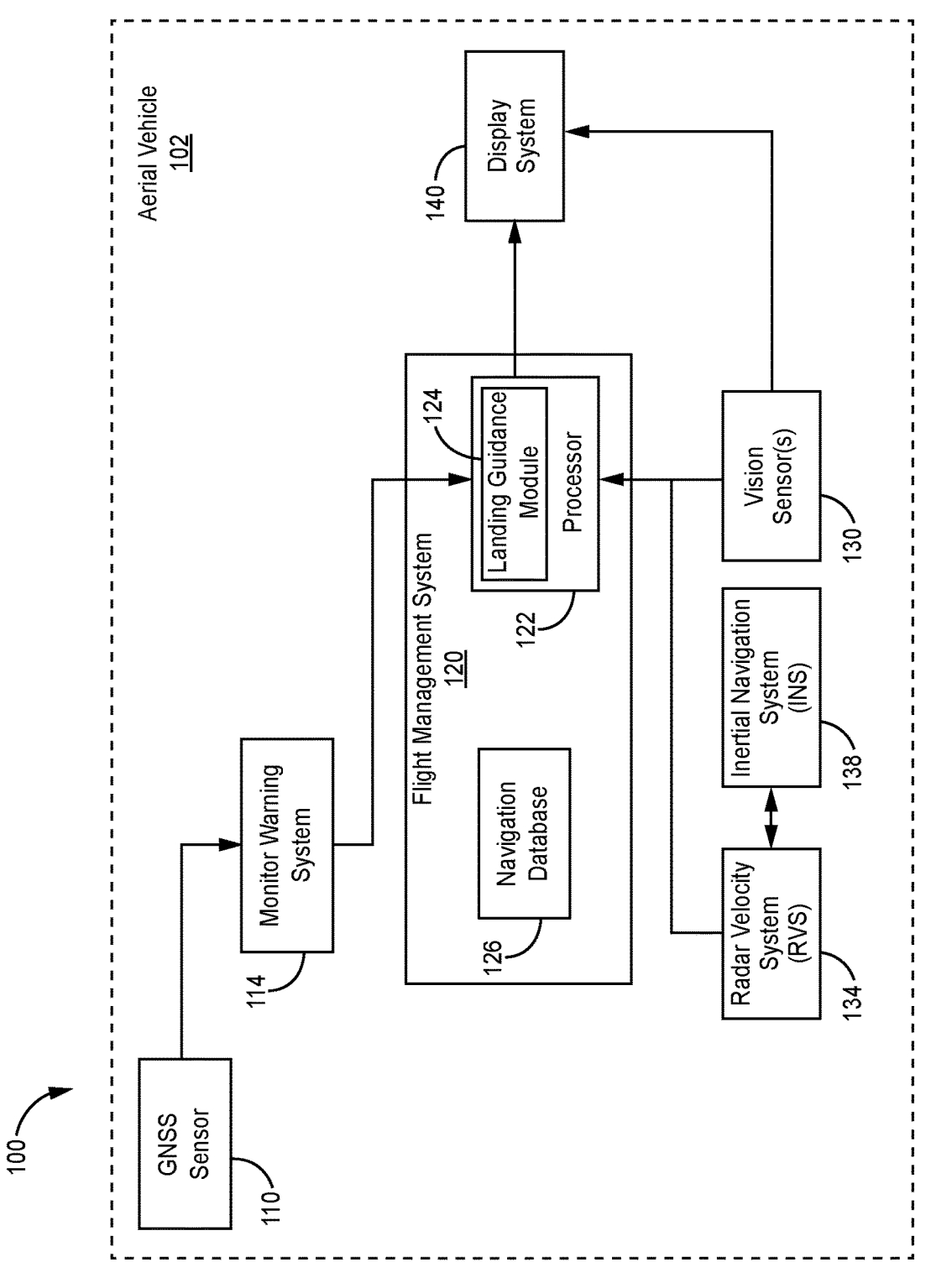
FIG. 1 is a block diagram of a system for landing guidance in a GNSS denied environment, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods for aircraft landing guidance, during flight in a GNSS denied environment, are described herein.

The present systems generally include a GNSS sensor onboard an aircraft, and a monitor warning system in communication with the GNSS sensor, with the monitor warning system operative to determine whether the aircraft is in a GNSS denied environment. A flight management system onboard the aircraft includes a landing guidance module, and a navigation database that has location coordinates for one or more landing sites such as vertiports. A vision system and a radar velocity system on the aircraft communicate with the landing guidance module, and an inertial navigation system (INS) on the aircraft communicates with the radar velocity system. When the monitor warning system determines that the aircraft is flying in a GNSS denied environment, the landing guidance module is activated and calculates an optimal flight path for safely landing the aircraft.

For example, when a GNSS disruption is detected, the radar velocity system is employed to aid the INS in correcting navigation errors, such that the INS continues to provide accurate aircraft location, depth and relative velocity. Based on these parameters, the landing guidance module calculates an optimal flight path angle, such as to a selected vertiport. The optimal flight path angle is used to provide guidance to a pilot, or to an autopilot system, so that the landing of the aircraft is as safe as possible. The vison system such as a camera system can provide more accurate guidance and situational awareness to the pilot. A display system can be used by the pilot to receive the guidance.

The selection of the vertiport can be done by a pilot, or can be done automatically based on a predefined mission and health of the aircraft. For example, the system can run a nearest vertiport search algorithm and the nearest vertiport location can be provided to the pilot in order to make the pilot selection process easier. The system then provides the selected vertiport location to the landing guidance module for further processing.

The present system can be activated automatically during GNSS signal disruptions, and can automatically identify nearest landing locations based on the navigation database such as a predefined vertiport database. The system uses a set of parameters from a radar velocity system (RVS) aided INS to calculate a standard flight path angle, and a dynamic flight path angle (based on environmental conditions and aircraft configuration) to automatically calculate the optimal flight path angle to a landing area such as a vertiport location.

In addition, the outputs from the radar velocity system and the vision system can be integrated to provide better situational awareness and obstacle detection capabilities to the pilot. If the aircraft is far away from a vertiport location, then the system relies on range and velocity parameters derived from the INS, the radar velocity system, and the vison system, for real time guidance and navigation to a selected vertiport location. The system can calculate a landing flight path angle by using vertiport latitude and longitude coordinates from the navigation database.

In one scenario, the present methods enable automatic landing of aircraft in GNSS denied environments, by providing the optimal flight path angle to guidance navigation and control systems, such as an automatic flight control system (AFCS) onboard the aircraft. In another scenario, the optimal flight path angle can be used to effectively guide a pilot while navigating the aircraft in a GNSS denied environment, by providing landing guidance to the pilot for use in manual landing of the aircraft. The pilot can use the optimal flight path angle, as well as camera guidance, for more situational awareness to perform a safe landing of the aircraft.

The present systems and methods can be used to provide for safe landing of various vehicles in a GNSS denied environment. Examples of such vehicles include crewed aircraft, uncrewed aircraft, vertical takeoff and landing (VTOL) aircraft, urban air mobility (UAM) vehicles, or the like.

Further details of various embodiments are described hereafter and with reference to the drawings.

FIG. 1 illustrates a system 100 for landing guidance in a GNSS denied environment, according to one embodiment. The system 100 is implemented on an aerial vehicle 102, such as a UAM vehicle, a UAS vehicle, or the like. The system 100 generally comprises a GNSS sensor 110 onboard aerial vehicle 102, and a monitor warning system 114 in operative communication with GNSS sensor 110. The monitor warning system 114 is operative to determine whether aerial vehicle 102 is in a GNSS denied environment. The system 100 also includes a flight management system 120 onboard aerial vehicle 102 and in operative communication with monitor warning system 114.

The flight management system 120 includes at least one processor 122 that hosts a landing guidance module 124, and a navigation database 126 that includes location coordinates of one or more landing sites. The system 100 further includes one or more vision sensors 130, such as one or more IR cameras, mounted on aerial vehicle 102 and in operative communication with landing guidance module 124. An onboard radar velocity system (RVS) 134 is also in operative communication with landing guidance module 124, and an onboard inertial navigation system (INS) 138 is in operative communication with radar velocity system 134.

During operation of system 100, when monitor warning system 114 determines that aerial vehicle 102 is located in a GNSS denied environment, the landing guidance module 124 is activated. As described further hereafter, the landing guidance module 124 then calculates an optimal landing flight path angle with respect to a landing site for aerial vehicle 102, based on various inputs received from the sensors employed in system 100. For example, the landing guidance module can receive depth and velocity estimates from the radar velocity system 134 to calculate the optimal landing flight path angle.

In some embodiments, an onboard display system 140 is in operative communication with landing guidance module 124 and vision sensors 130. The display system 140 is configured to receive various inputs, such as a three-dimensional (3D) view from vision sensors 130 to provide more accurate guidance to a pilot for situational awareness. In addition, display system 140 can show a guidance path based on the optimal landing flight path angle calculated by landing guidance module 124, and can announce messages when the landing guidance module is activated.

In some embodiments, the flight management system 120 can further include a nearest landing site algorithm on navigation database 126. The nearest landing site algorithm is operative to provide an optimal landing site based on a state of aerial vehicle 102 and availability of landing locations.

In some embodiments, the landing guidance module is operative to send a guidance path based on the optimal landing flight path angle to an automatic flight control system (AFCS) on aerial vehicle 102. The AFCS is configured to follow the guidance path to perform a safe automatic landing of aerial vehicle 102 at the landing site.

In some embodiments, the landing guidance module is operative to provide a guidance path based on the optimal landing flight path angle to a pilot of the aerial vehicle, such that the pilot can follow the guidance path to perform a safe landing of aerial vehicle 102 at the landing site.

FIG. 2 is a flow diagram of an operational method 200 performed by a landing guidance module for an aerial vehicle, such as landing guidance module 124, according to an exemplary implementation. The method 200 includes receiving image data from one or more vision sensors (e.g., IR cameras) onboard the aerial vehicle, with the image data corresponding to one or more terrain images, captured by the one or more vision sensors, over which the aerial vehicle is traveling (block 210). The method 200 further comprises receiving position, velocity and altitude data for the aerial vehicle from a radar velocity system (block 220), such as RVS 134; and receiving location coordinates of a landing site selected by a user from a navigation database (block 230), such as navigation database 126. The method 200 then includes processing the image data, and the position, velocity and altitude data, to determine a real time location of the aerial vehicle, and provide 3D imaging of a route to approach the landing site (block 240). The method 200 further includes calculating a landing flight path angle with respect to the landing site when the aerial vehicle approaches the landing site, using current location coordinates of the aerial vehicle and the location coordinates of the landing site (block 250).

Various sub-systems used in the present approach are described in further detail as follows.

Sensor Systems

Inputs from multiple sensor systems are implemented by the present methods. These include inputs form a GNSS sensor such as a GPS sensor, a radar velocity system, and a vision system such as a camera system.

A GNSS sensor parameter from the GNSS sensor is used to activate the landing guidance function when a GNSS denied environment is detected. For example, when a GNSS signal value is below a user-selected threshold level, the monitor warning system activates the landing guidance module.

The RVS can be provided as a low size, weight and power (SWaP), radar-based navigation aiding system. The RVS uses millimeter wave (mmWave) sensing technology (e.g., about 60-64 GHz or about 76-81 GHz) and outputs range, velocity and angle of objects. The RVS can provide centimeter (cm) level-radar accuracy and is impervious to environmental conditions such as rain, fog, dust, or snow.

The RVS is installed on an aerial vehicle, along with an INS, to provide various parameters such as current location coordinates, altitude of the aerial vehicle, a depth (range) to land, a relative velocity, or the like. The RVS can act as a velocity aid while providing altitude measurements, depth mapping, and ground avoidance. The RVS can be used for depth sensing to provide accurate measurement of a path between the aerial vehicle and a landing site. For example, the RVS can transmit radio waves toward a vertiport, and based on the reflection of these radio waves from the vertiport in a GNSS denied environment, can provide different parameters as needed for the calculation of a landing path. The RVS, along with the INS, provides the current location coordinates (latitude/longitude) that are used for calculating the landing path angle in the landing guidance module for calculation of the landing path.

The vision system can include one or more cameras installed on the aerial vehicle, such as to provide a 360 degree view of the aerial vehicle surroundings during flight. The one or more cameras can include an infrared (IR) camera for low visibility conditions. Image data from the cameras can be fused together to produce a 3D rendering of the landing site, providing guidance and navigation for safe landing of the aerial vehicle in a GPS denied environment.

The RVS and INS provide for safe landing navigation during continuous GNSS disruptions. When inputs from the vision system are paired with inputs from the RVS, using sensor fusion techniques, a pilot can have a greater level of situational awareness, allowing for a more accurate landing of the aerial vehicle.

Monitor Warning System and Display System

The monitor warning system installed on the aerial vehicle is configured to detect weak GNSS signals to identify a GNSS denied environment. The monitor warning system receives a pilot selected nearest vertiport location, and receives the GNSS signals for detection of GNSS signal strength. The monitor warning system uses the vertiport location to activate the landing guidance system when the aerial vehicle is near the vertiport and the GNSS signals are weak or lost. As described further hereafter, the vertiport location is also used by the landing guidance system for the calculation of the landing flight path for the aerial vehicle.

A display system is configured to receive various inputs from different sub-systems. For example, the display system can show a camera view to increase pilot situational awareness, such as 3D view of the camera for providing more accurate guidance to the pilot. Also, the display system can show an optimal flight path for the aircraft, and can announce messages based on the activation of the landing guidance system.

Flight Management System

The flight management system (FMS) is configured to receive various inputs from the sensor systems, the monitor warning system, and the display system. As described previously, the flight management system includes a landing guidance module, and a navigation database that has location coordinates for landing sites such as vertiports. The landing guidance module receives a vertiport location from the display system, and a current location, altitude, and velocity of the aircraft from the RVS. The landing guidance module also receives image data from the vision system. The landing guidance module can use the image data and RVS data to determine real time location in space using visual simultaneous localization and mapping (VSLAM) for 3D imaging of the route to reach the nearest vertiport location. The landing guidance module also provides outputs to the display system and/or the AFCS.

The flight management system is configured to run a nearest vertiport search algorithm on the navigation database to provide nearest vertiport information to a display for vertiport location selection. The selected vertiport location is sent to the monitor warning system for activating the landing guidance module when the aircraft is in a GNSS denied environment. Once the vertiport location is selected and the landing guidance module is activated, the vertiport location is also shared with the landing guidance module for use in calculation of an optimal flight path.

When the aircraft approaches near the selected vertiport, the landing guidance module uses the current aircraft location coordinates and vertiport location coordinates to calculate the landing flight path angle with respect to the vertiport if the vertiport is in a line of sight (LOS) of the aircraft.

Figure 3:
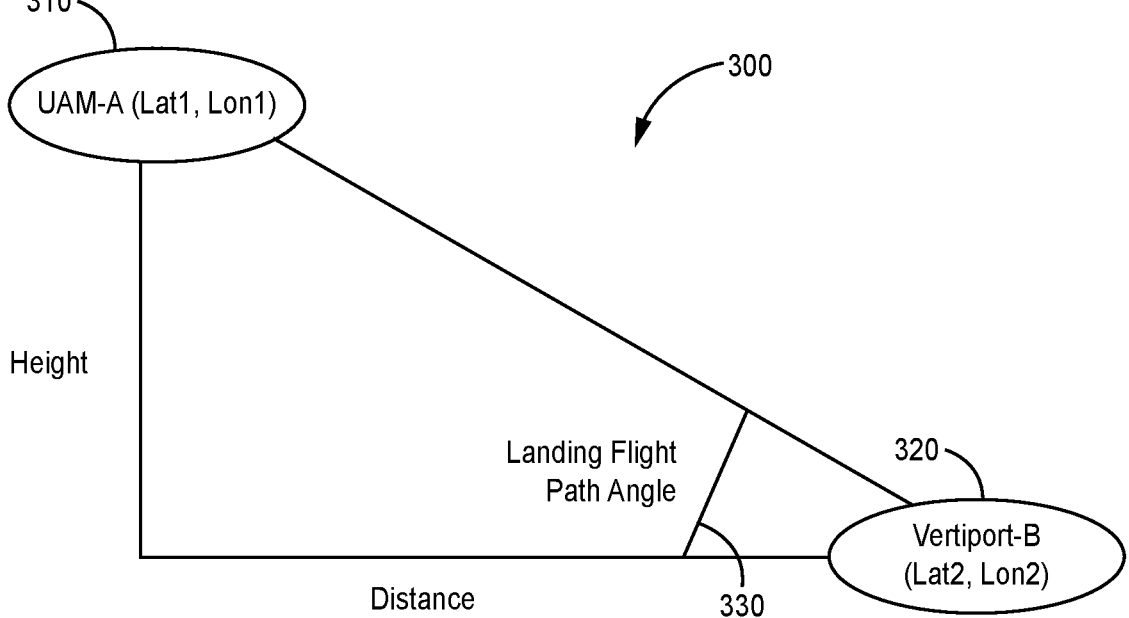
FIG. 3 is a schematic diagram of an example landing flight path angle and distance calculation for an aerial vehicle with respect to a vertiport.

FIG. 3 is a schematic diagram of an example landing flight path angle and distance calculation 300 for an aerial vehicle. As shown in FIG. 3, if a UAM vehicle 310 is at location A with first latitude and longitude coordinates (Lat1, Lon1), and a vertiport 320 is at location B with second latitude and longitude coordinates (Lat2, Lon2), then the following equations can be applied to obtain the landing flight path angle (FPA) 330 at a current altitude (height):

$$\text{Current Landing FPA (radian)}=a\tan2(\text{Lon2}-\text{Lon1}, \text{Lat2}-\text{Lat1}) \qquad (1)$$

$$\text{Current Landing FPA (degree)}=a\tan2(\text{Lon2}-\text{Lon1}, \text{Lat2}-\text{Lat1})*180/\text{Pi} \qquad (2)$$

The equations (1) and (2) can be used to calculate a current landing flight path angle continuously at different altitudes, with altitude information and the latest coordinates being provided by the RVS along with the INS.

The required optimal (Opt) flight path angle can be based on a standard landing flight path angle, an optimal landing flight path angle for a specific aircraft configuration (A/C config), or a flight path angle based on environmental conditions (e.g., wind, weather information from a weather radar, obstruction detected by the RVS system, etc.). The required optimal flight path angle calculation equation follows:

$$\text{Required Landing FPA(Opt)=Function(Landing FPA (Std),Dyn FPA(Env,A/C config))} \quad (3)$$

where the Landing FPA (Std) is a standardized landing flight path angle for efficient landing, and Dyn FPA (Env) is a dynamic flight path angle based on outside environment conditions (e.g., wind, weather, obstruction, etc.) calculated by the flight management system.

The optimal flight path angle can be calculated at different altitudes using the current landing FPA calculated in equation (2) and the required landing FPA (Opt) in equation (3) as follows:

$$\text{Optimal Flight Path Angle=Function(Required Landing FPA(Opt),Landing FPA(current altitude, speed)} \quad (4)$$

The optimal flight path angle calculated in equation 4 can be used to align the aircraft with the flight angle needed for safe landing. An algorithm represented by equations (1)-(4) can be continuously run until the aircraft has performed the safe landing. Additionally, the optimal flight path angle can be used to get the distance to landing information using the following equation:

$$\text{Distance=height/tan(landing angle)} \quad (5)$$

Figure 4:
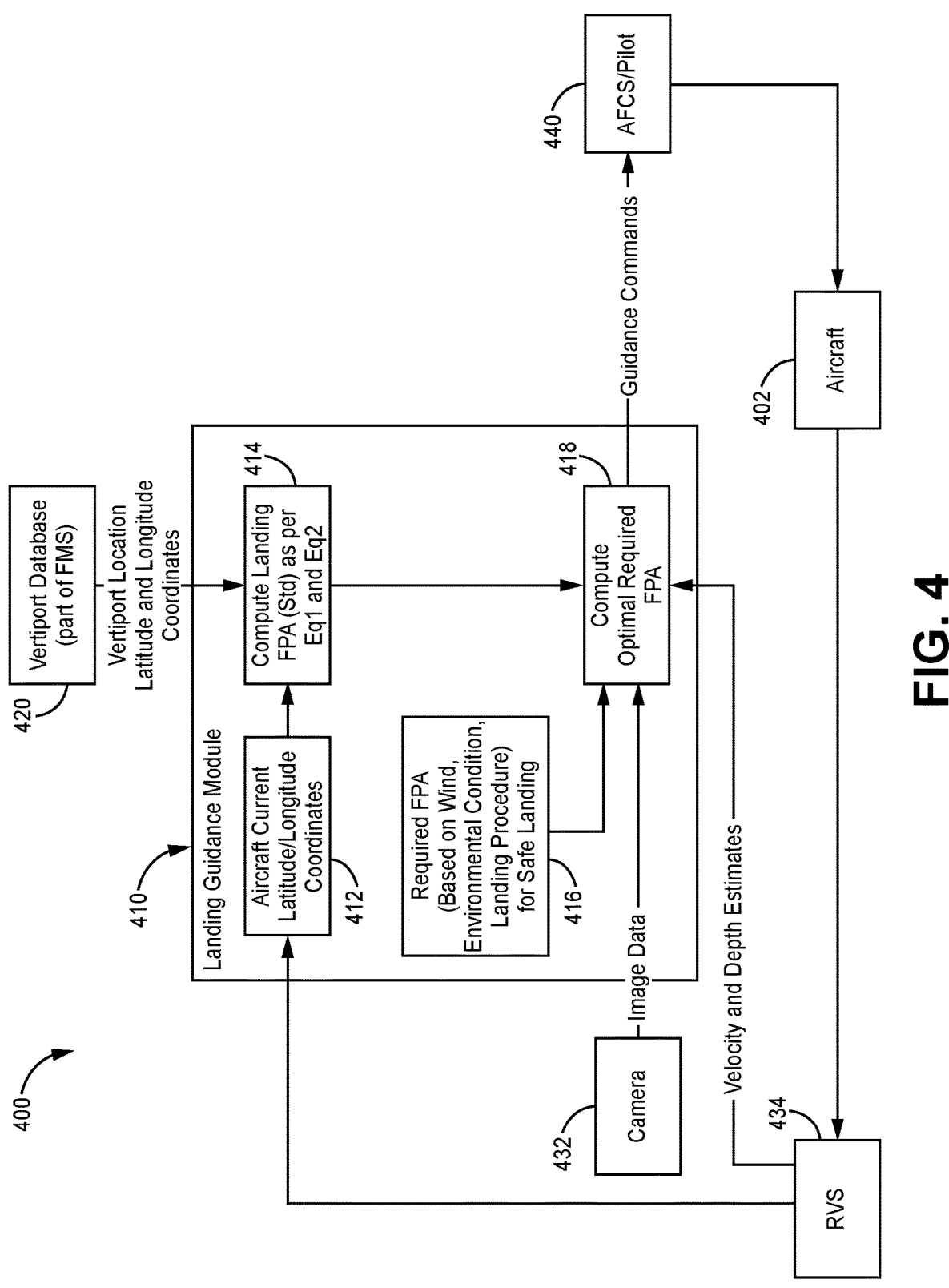
FIG. 4 is a block diagram of a system for producing standard and optimal flight path angle calculations for landing guidance in a GNSS denied environment, according to an example embodiment.

FIG. 4 is a block diagram of a system 400 for producing standard and optimal flight path angle calculations for landing guidance of an aircraft 402 in a GNSS denied environment, according to an example embodiment. The system 400 generally includes a landing guidance module 410, which is located in a flight management system (FMS) of aircraft 402, and a vertiport database 420 that is also part of the FMS. In addition, various onboard sensor systems communicate with landing guidance module 410, including a camera 432, and a radar velocity system (RVS) 434. An inertial navigation system (not shown) onboard aircraft 402 is in operative communication with RVS 434.

The landing guidance module 410 is configured to receive the aircraft's current latitude and longitude coordinates (block 412), from RVS 434. The landing guidance module 410 computes the landing FPA (Std) as per equations (1) and (2) (block 414), using the aircraft's current latitude and longitude coordinates (from block 412) and a selected vertiport location (with latitude and longitude coordinates) provided by vertiport database 420.

The landing guidance module 410 also provides the required FPA (based on wind, environmental condition, landing procedure) for safe landing (block 416). The landing guidance module 410 computes the optimal required FPA (block 418), based on the landing FPA (Std) (from block 414), the required FPA (from block 416), image data from camera 432, as well as velocity and depth estimates from RVS 434. The computed optimal required FPA is then output as part of guidance commands for use by an automatic flight control system (AFCS) or a pilot (block 440), to aid in providing a safe landing of aircraft 402 at the vertiport.

Aircraft Landing Scenarios

Figure 5:
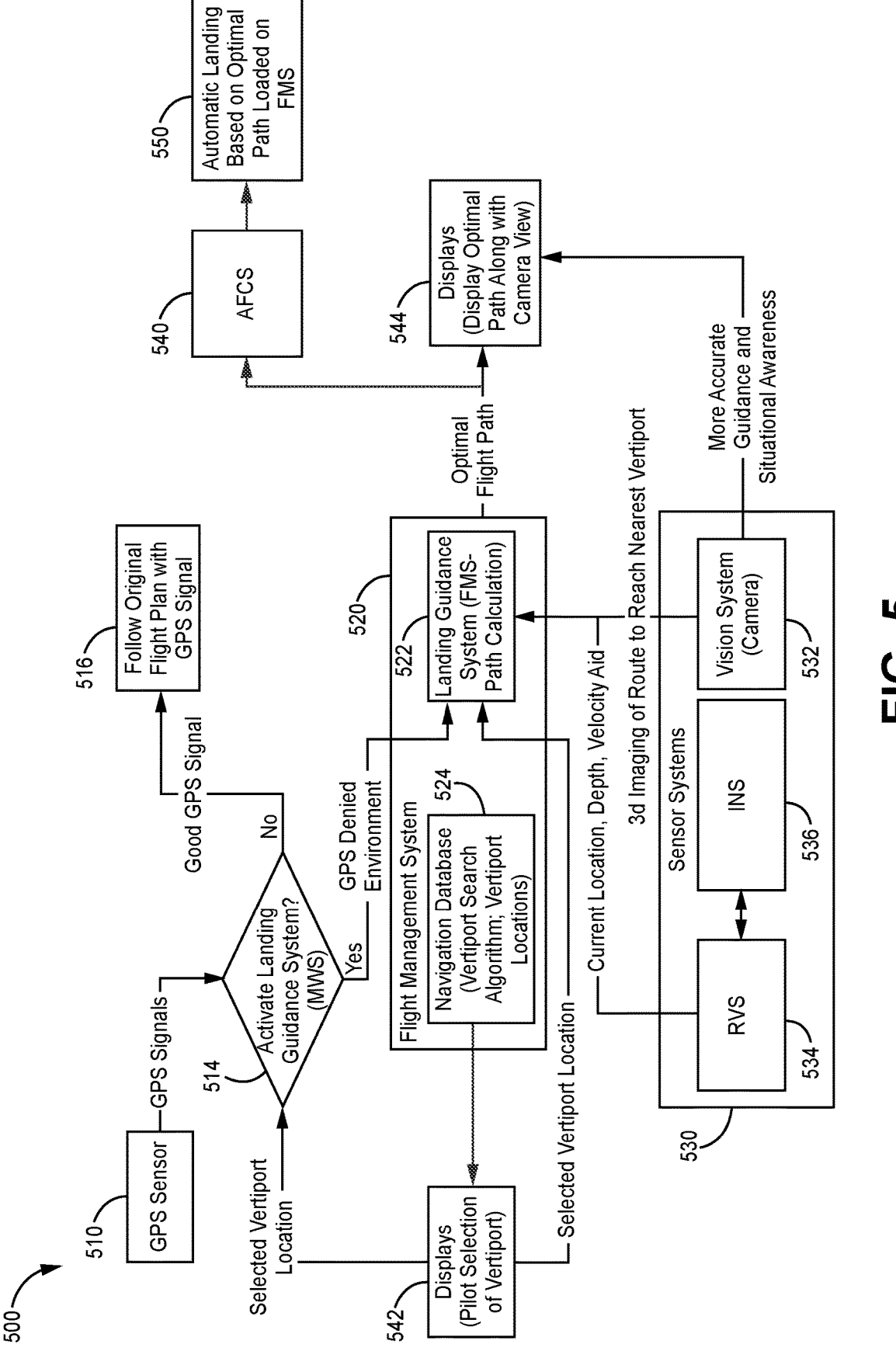
FIG. 5 is a block diagram of a system for landing guidance of an aircraft in a GPS denied environment, according to one example of an automatic landing scenario.

FIG. 5 is a functional block diagram for a system 500 for landing guidance of an aircraft in a GPS denied environment, according to one example of an automatic landing scenario. The system 500 generally includes a GPS sensor 510 onboard the aircraft, a flight management system 520 onboard the aircraft, and various onboard sensor systems 530 that communicate with flight management system 520.

The flight management system 520 includes a landing guidance system 522 for flight path calculations, and a navigation database 524 that includes a vertiport search algorithm and vertiport location coordinates. The sensor systems 530 include a vision system (camera) 532, a radar velocity system (RVS) 534, and an inertial navigation system (INS) 536 in operative communication with RVS 534. In addition, a display system can be in operative communication with landing guidance system 522, navigation database 524, and vision system 532. An automatic flight control system (AFCS) 540 onboard the aircraft is in operative communication with landing guidance system 522.

During operation of system 500 for automatic landing, the vertiport search algorithm on navigation database 524 provides a nearest vertiport list to the display system for pilot selection of a vertiport (block 542). The GPS sensor 510 sends GPS signals to a monitor warning system (MWS) at 514, which determines whether to activate landing guidance system 522. In addition, the pilot selected vertiport location is sent to the MWS at 514 and to landing guidance system 522. If the MWS determines that there is a good GPS signal, then landing guidance system 522 is not activated, and the aircraft follows the original flight plan using the good GPS signal (block 516). If the MWS determines that the aircraft is in a GPS denied environment, then landing guidance system 522 is activated.

The landing guidance system 522 calculates an optimal flight path with respect to the selected vertiport location, based on various inputs received from sensor systems 530. For example, landing guidance system 522 can receive current location, depth, and velocity data from RVS 534, and can receive 3D imaging of the route to reach the nearest vertiport from vision system 532. The calculated optimal flight path is sent to the display system, which shows the optimal flight path along with a camera view (block 544). The camera view is sent to the display system by vision system 532 to provide more accurate guidance and situational awareness to the pilot. The optimal flight path is also sent to AFCS 540, which provides for automatic landing of the aircraft based on the optimal path loaded on the flight management system (FMS) (block 550).

Figure 6:
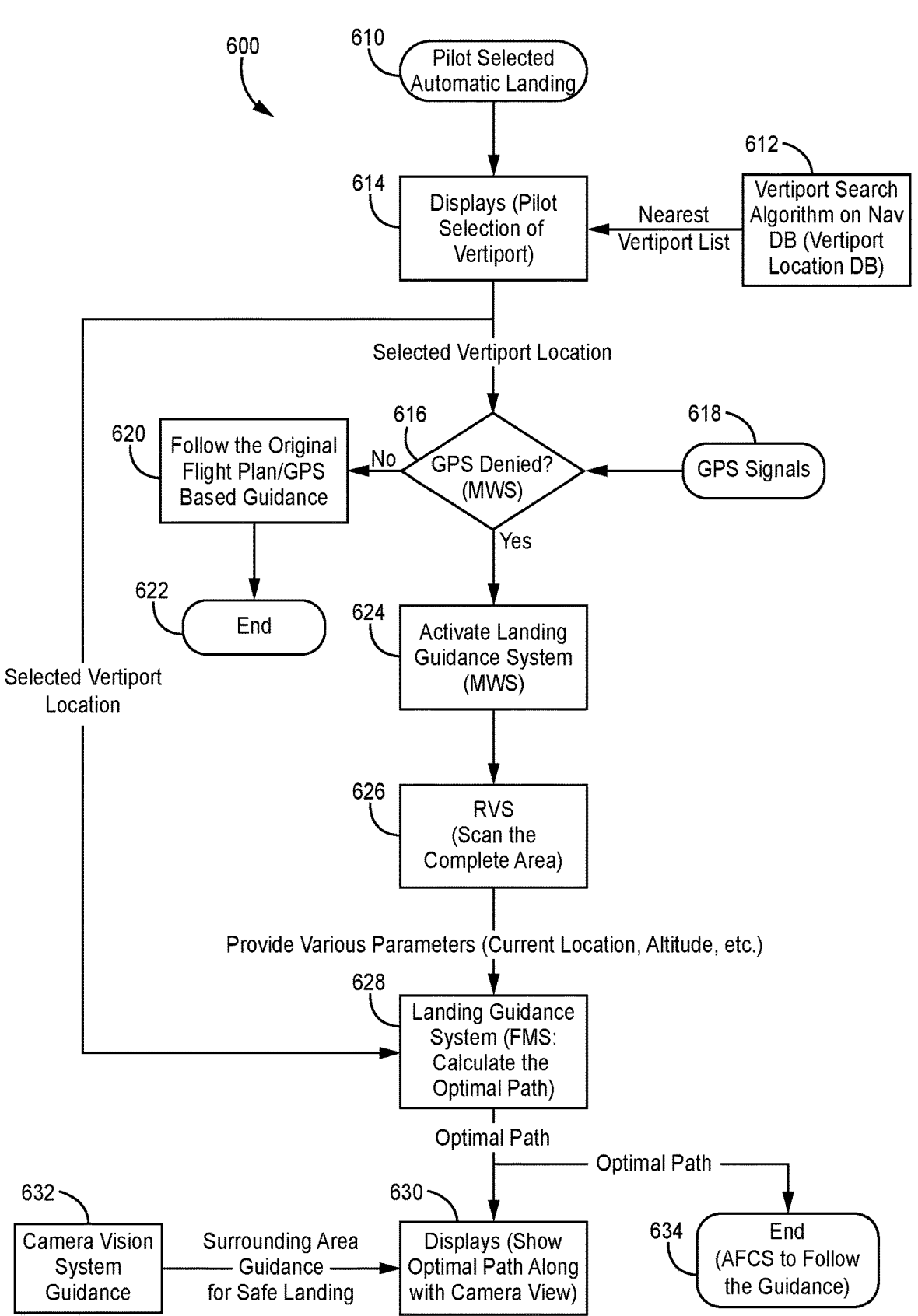
FIG. 6 is a flow diagram of a method for landing guidance of an aircraft in a GPS denied environment, according to one example of an automatic landing scenario.

FIG. 6 is a flow diagram for a method 600 for landing guidance of an aircraft in a GPS denied environment, according to one example of an automatic landing scenario. Initially, method 600 begins with a pilot selected automatic landing at 610. A vertiport search algorithm on a navigation database (DB) (block 612), which includes a vertiport location database, provides a nearest vertiport list to a display system for pilot selection of a vertiport (block 614). The selected vertiport location is sent to a monitor warning system (MWS) at 616, which is also to configured to receive GPS signals 618, to determine whether the aircraft is in a GPS denied environment. If the MWS determines that the aircraft is not a GPS denied environment, the aircraft follows the original flight plan with the GPS based guidance (block 620), and method 600 ends at 622. If the MWS determines that the aircraft is in a GPS denied environment, then method 600 activates a landing guidance system through the MWS (block 624).

A RVS scans the complete area around the aircraft (block 626), and provides various parameters such as current location, altitude, etc. to the landing guidance system (block 628), which also receives the selected vertiport location. The landing guidance system calculates and outputs the optimal path for the aircraft. The optimal path is sent to the display system, which shows the optimal path along with a camera view (block 630). The camera view is provided by camera vision system guidance (block 632), such that surrounding area guidance for safe landing is sent to the display system. The method 600 ends at 634 with the optimal path being sent to the AFCS, which follows the guidance based on the optimal path to provide for automatic landing of the aircraft.

Figure 7:
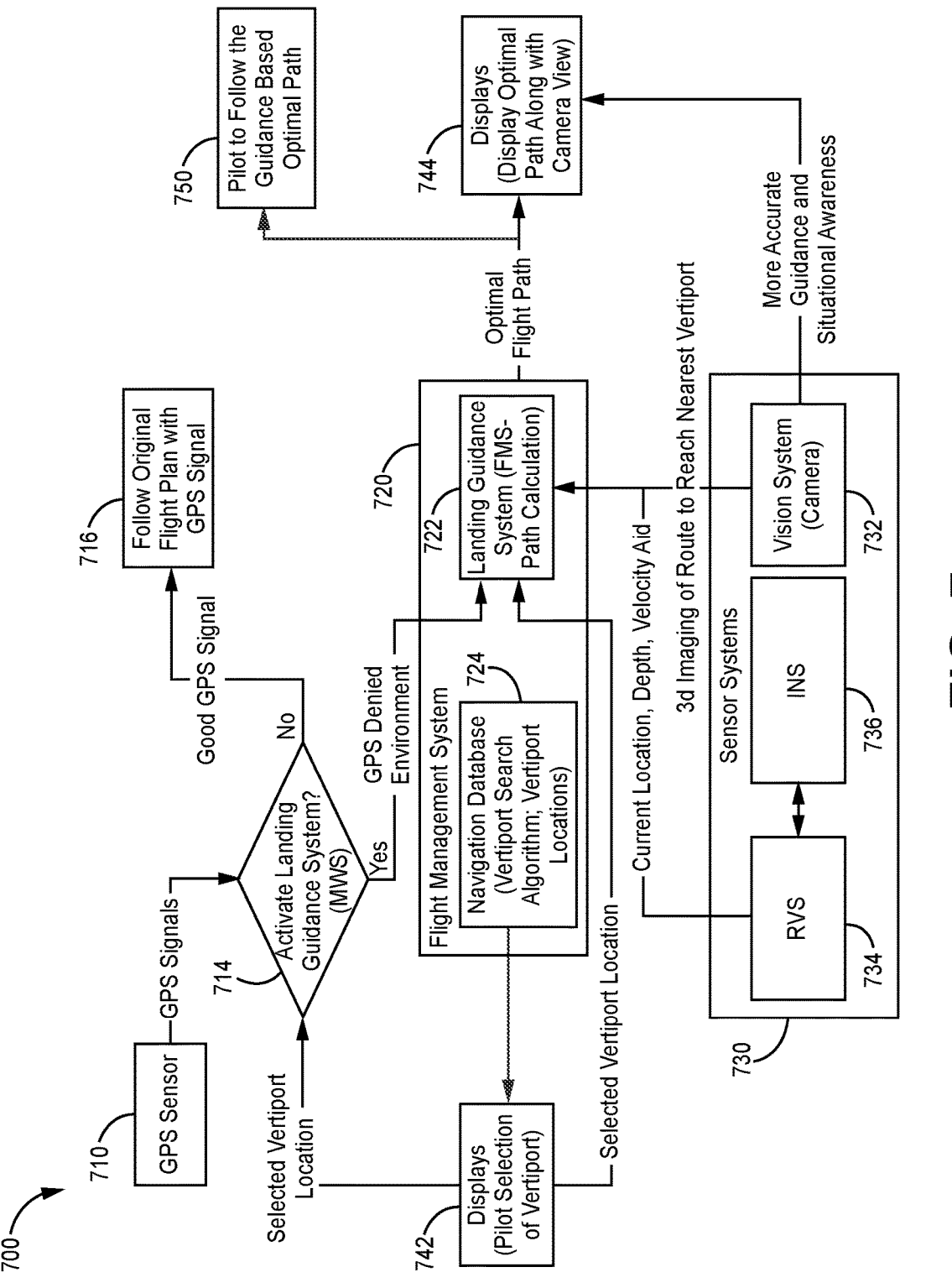
FIG. 7 is a block diagram of a system for landing guidance of an aircraft in a GPS denied environment, according to one example of a manual landing scenario.

FIG. 7 is a functional block diagram for a system 700 for landing guidance of an aircraft in a GPS denied environment, according to one example of a manual landing scenario. The system 700 generally includes a GPS sensor 710 onboard the aircraft, a flight management system 720 onboard the aircraft, and various onboard sensor systems 730 that communicate with flight management system 720. The flight management system 720 includes a landing guidance system 722 for flight path calculations, and a navigation database 724 that includes a vertiport search algorithm and vertiport location coordinates. The sensor systems 730 include a vision system (camera) 732, a radar velocity system (RVS) 734, and an inertial navigation system (INS) 736 in operative communication with RVS 734. In addition, a display system can be in operative communication with landing guidance system 722, navigation database 724, and vision system 732.

During operation of system 700 for manual landing, the vertiport search algorithm on navigation database 724 provides a nearest vertiport list to the display system for pilot selection of a vertiport (block 742). The GPS sensor 710 sends GPS signals to a monitor warning system (MWS) at 714, which determines whether to activate landing guidance system 722. In addition, the pilot selected vertiport location is sent to the MWS at 714 and to landing guidance system 722. If the MWS determines that there is a good GPS signal, then landing guidance system 722 is not activated, and the aircraft follows the original flight plan using the good GPS signal (block 716). If the MWS determines that the aircraft is in a GPS denied environment, then landing guidance system 722 is activated.

The landing guidance system 722 calculates an optimal flight path with respect to the selected vertiport location, based on various inputs received from sensor systems 730. For example, landing guidance system 722 can receive current location, depth, and velocity data from RVS 734, and can receive 3D imaging of the route to reach the nearest vertiport from vision system 732. The calculated optimal flight path is sent to the display system, which shows the optimal flight path along with a camera view (block 744). The camera view is sent to the display system by vision system 732 to provide more accurate guidance and situational awareness to the pilot. The displayed optimal flight path and camera view allow the pilot to follow the guidance based optimal path (block 750), to safely land the aircraft at the vertiport.

Figure 8:
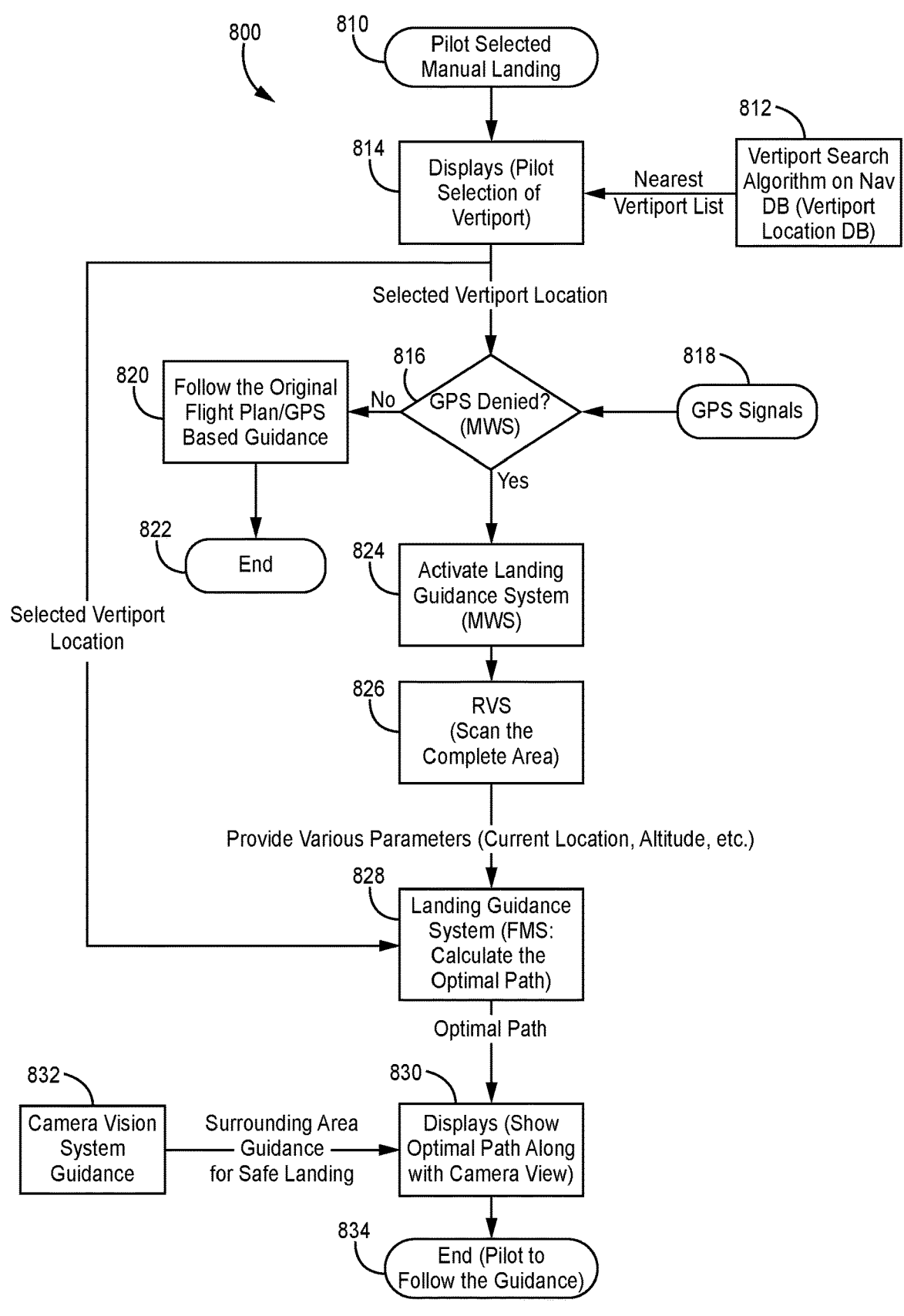
FIG. 8 is a flow diagram of a method for landing guidance of an aircraft in a GPS denied environment, according to one example of a manual landing scenario.

FIG. 8 is a flow diagram for a method 800 for landing guidance of an aircraft in a GPS denied environment, according to one example of a manual landing scenario. Initially, method 800 begins with a pilot selected manual landing at 810. A vertiport search algorithm on a navigation database (block 812), which includes a vertiport location database, provides a nearest vertiport list to a display system for pilot selection of a vertiport (block 814). The selected vertiport location is sent to a monitor warning system (MWS) at 816, which is also to configured to receive GPS signals 818, to determine whether the aircraft is in a GPS denied environment. If the MWS determines that the aircraft is not a GPS denied environment, the aircraft follows the original flight plan with the GPS based guidance (block 820), and method 800 ends at 822. If the MWS determines that the aircraft is in a GPS denied environment, then method 800 activates a landing guidance system (block 824).

A RVS scans the complete area around the aircraft (block 826), and provides various parameters such as current location, altitude, etc. to the landing guidance system (block 828), which also receives the selected vertiport location. The landing guidance system calculates and outputs the optimal path for the aircraft. The optimal path is sent to the display system, which shows the optimal path along with a camera view (block 830). The camera view is provided by camera vision system guidance (block 832), such that surrounding area guidance for safe landing is sent to the display system. The method 800 ends at 834 with the displayed optimal path and camera view allowing the pilot to follow the guidance to safely land the aircraft at the vertiport.

Sensor Fusion System

Figure 9:
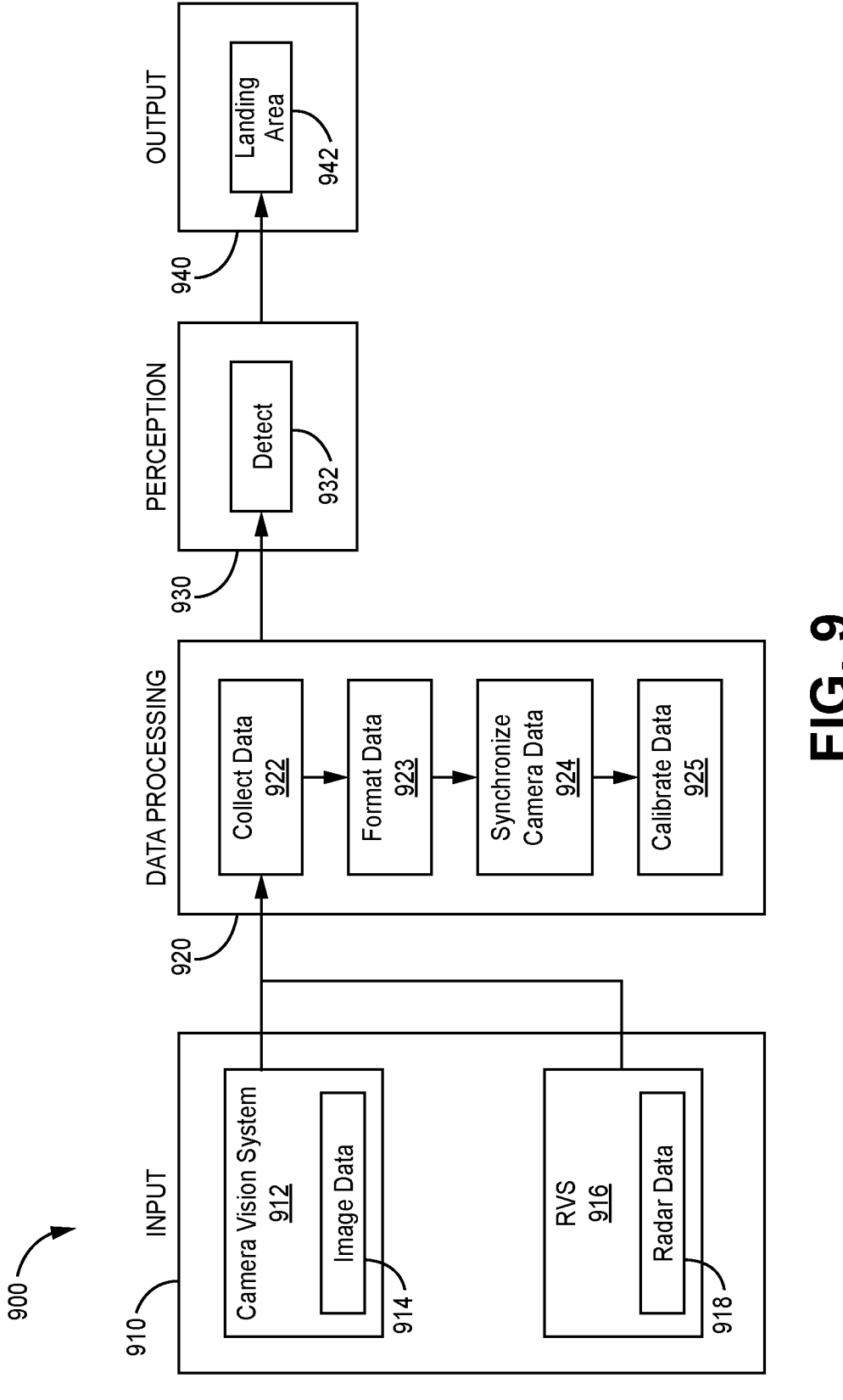
FIG. 9 is a block diagram of a sensor fusion system for use in providing landing guidance to an aircraft in a GNSS denied environment, according to an example embodiment.

FIG. 9 is a block diagram illustrating a sensor fusion system 900 for use in providing landing guidance to an aircraft in a GNSS denied environment, according to an example embodiment. The sensor fusion system 900 is operative to process and fuse data provided by various sensor inputs. The sensor fusion system 900 generally includes an input stage 910, a data processing stage 920 in operative communication with input stage 910, and a perception stage 930 in operative communication with data processing stage 920.

The input stage 910 includes a camera vision system 912 configured to produce image data 914, and a radar velocity system (RVS) 916 configured to produce radar data 918. The data processing stage 920 is configured to collect data at 922, format data at 923, synchronize camera data at 924, and calibrate data at 925. The perception stage 930 is configured to detect the fused data at 932 and provide an output at 940 that includes visual images of a landing area 942 for the aircraft.

In an example operation of sensor fusion system 900, a camera unit of camera vision system 912 captures a 360-degree image of a landing approach area for the aircraft, and image data 914 corresponding to the captured image is sent to data processing stage 920. In addition, RVS 916 scans the landing approach area, and radar data 918 corresponding to the scanned landing approach area (e.g., depth of the landing approach area) is sent to data processing stage 920. The data processing stage 920 is operative to collect the received data at 922, format the collected data at 923, synchronize the camera data at 924, and calibrate the data at 925. The processed and fused data is sent from data processing stage 920 to perception stage 930, which detects the fused data at 932 to produce visual images of the landing approach area. The visual images are output at 940, such as to a display system showing landing area 942 for viewing by a pilot of the aircraft.

RVS Aided Navigation System

Figure 10:
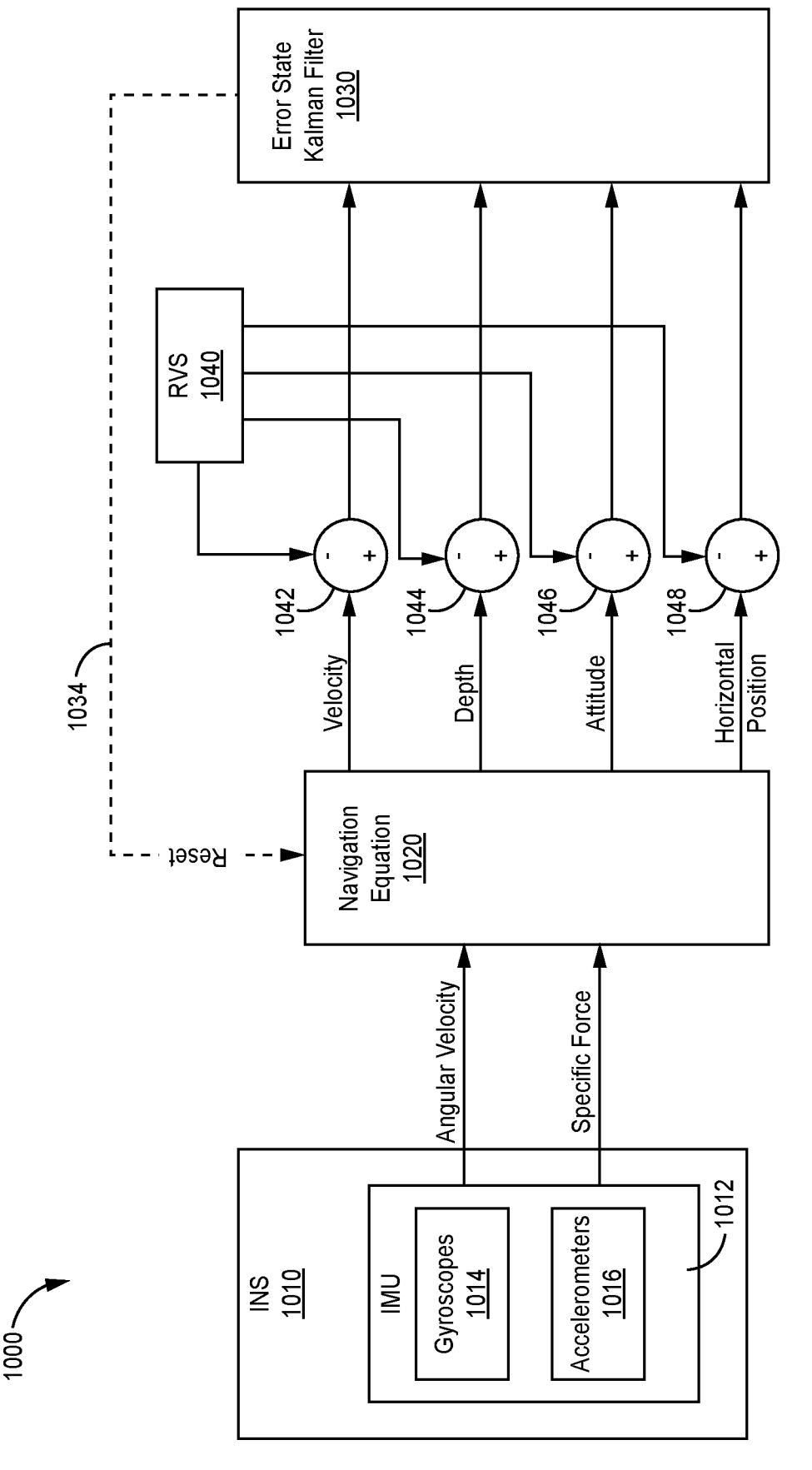
FIG. 10 is a block diagram of an aided navigation system for use in providing landing guidance to an aircraft in a GNSS denied environment, according to an example embodiment.

FIG. 10 is a block diagram illustrating an RVS aided navigation system 1000 for use in providing landing guidance to an aircraft in a GNSS denied environment, according to an example embodiment. The aided navigation system 1000 includes an INS 1010 in operative communication with an inertial measurement unit (IMU) 1012 operative to produce inertial measurements for the aircraft. The IMU 1012 includes a set of gyroscopes 1014 and accelerometers 1016. The aided navigation system 1000 also includes at least one processor that includes a navigation equation 1020, in operative communication with INS 1010 and IMU 1012. The navigation equation 1020 is operative to receive angular velocity and specific force data from IMU 1012. The aided navigation system 1000 also includes an error state Kalman filter 1030 that operatively communicates with navigation equation 1020, and a radar velocity system (RVS) 1040 in operative communication with navigation equation 1020 and error state Kalman filter 1030.

During operation, INS 1010 provides angular velocity and specific force data from IMU 1012 to navigation equation 1020, which generates velocity, depth, attitude, and horizontal position parameters for the aircraft. Errors in these parameters are corrected with the aid of RVS 1040 and error state Kalman filter 1030. The RVS 1040 helps to correct velocity and position errors from the initial position and velocity provided by INS 1010. An error correction signal is sent in a reset feedback loop 1034 from error state Kalman filter 1030 to navigation equation 1020 to provide updated parameters.

For example, velocity data can be sent from navigation equation 1020 to adder/subtractor 1042, which also receives RVS data from RVS 1040. The combined velocity and RVS data is then sent from adder/subtractor 1042 to error state Kalman filter 1030 for further processing. Depth data can be sent from navigation equation 1020 to adder/subtractor 1044, which also receives RVS data from RVS 1040. The combined depth and RVS data is then sent from adder/subtractor 1044 to error state Kalman filter 1030 for further processing. Attitude data can be sent from navigation equation 1020 to adder/subtractor 1046, which also receives RVS data from RVS 1040. The combined attitude and RVS data is then sent from adder/subtractor 1046 to error state Kalman filter 1030 for further processing. Horizontal position data can be sent from navigation equation 1020 to adder/subtractor 1048, which also receives RVS data from RVS 1040. The combined horizontal position and RVS data is then sent from adder/subtractor 1048 to error state Kalman filter 1030 for further processing.

The one or more processors and/or other computational devices used in the method and system described herein may be implemented using software, firmware, hardware, or appropriate combinations thereof. The processors and/or other computational devices may be supplemented by, or incorporated in, specially-designed application-specific integrated circuits (ASICs) or field programmable gate arrays (FPGAs). In some implementations, the processors and/or other computational devices may communicate through one or more transceivers with other computing devices outside of the navigation system, such as those associated with a management system or computing devices associated with other subsystems controlled by the management system. The processors and/or other computational devices can also include or function with software programs, firmware, or other computer readable instructions for carrying out various process tasks, calculations, and control functions used in the method and system described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a system comprising: a global navigation satellite system (GNSS) sensor onboard an aerial vehicle; a monitor warning system in operative communication with the GNSS sensor, the monitor warning system operative to determine whether the aerial vehicle is in a GNSS denied environment; a flight management system onboard the aerial vehicle, the flight management system including at least one processor that hosts a landing guidance module, and a navigation database that includes location coordinates of one or more landing sites; one or more vision sensors mounted on the aerial vehicle and in operative communication with the landing guidance module; a radar velocity system (RVS) onboard the aerial vehicle and in operative communication with the landing guidance module; and an inertial navigation system onboard the aerial vehicle and in operative communication with the RVS; wherein when the monitor warning system determines that the aerial vehicle is located in a GNSS denied environment, the landing guidance module is activated and is operative to calculate an optimal flight path by a process that comprises: receive image data from the one or more vision sensors, the image data corresponding to one or more terrain images over which the aerial vehicle is traveling; receive position, velocity and altitude data for the aerial vehicle from the RVS; receive location coordinates of a landing site selected by a user from the navigation database; process the image data, and the position, velocity and altitude data, to determine a real time location of the aerial vehicle and provide three-dimensional (3D) imaging of a route to the landing site; and calculate a landing flight path angle with respect to the landing site when the aerial vehicle reaches the landing site, using current location coordinates of the aerial vehicle and the location coordinates of the landing site.

Example 2 includes the system of Example 1, wherein the flight management system further includes a nearest landing site algorithm operative to provide an optimal landing site based on a state of the aerial vehicle and availability of landing locations.

Example 3 includes the system of any of Examples 1-2, wherein the landing guidance module is further operative to receive depth and velocity estimates from the RVS to calculate an optimal flight path angle.

Example 4 includes the system of Example 3, wherein the landing guidance module is operative to send a guidance path based on the optimal flight path angle to an automatic flight control system (AFCS) on the aerial vehicle, wherein the AFCS is configured to follow the guidance path to perform a safe landing of the aerial vehicle at the landing site.

Example 5 includes the system of Example 3, wherein the landing guidance module is operative to provide a guidance path based on the optimal flight path angle to a pilot of the aerial vehicle, such that the pilot can follow the guidance path to perform a safe landing of the aerial vehicle at the landing site.

Example 6 includes the system of any of Examples 1-5, wherein the one or more vision sensors include one or more infrared (IR) cameras.

Example 7 includes the system of any of Examples 1-6, further comprising a display system configured to receive multiple inputs, including a 3D camera view for providing accurate guidance and situational awareness to a pilot.

Example 8 includes the system of Example 7, wherein the display system is configured to show a guidance path based on an optimal flight path angle calculated by the landing guidance module, and announce a message when the landing guidance module is activated.

Example 9 includes the system of any of Examples 1-8, wherein the aerial vehicle is a crewed aircraft.

Example 10 includes the system of any of Examples 1-8, wherein the aerial vehicle is an uncrewed aircraft.

Example 11 includes the system of any of Examples 1-10, wherein the aerial vehicle comprises a vertical takeoff and landing (VTOL) aircraft, or an urban air mobility (UAM) vehicle.

Example 12 includes a method of producing landing guidance for an aircraft, the method comprising: sending a nearest vertiport list from a vertiport location database to a display system for selection of a vertiport location by a user; sending the selected vertiport location to a monitor warning system, which is also to configured to receive global navigation satellite system (GNSS) signals; determining in the monitor warning system whether the aircraft is in a GNSS denied environment; wherein if the aircraft is not in a GNSS denied environment, the aircraft continues following an original flight plan with GNSS based guidance; wherein if the aircraft is in a GNSS denied environment, activating a landing guidance system, with the method further comprising: scanning an area around the aircraft with a radar velocity system (RVS) to obtain a set of parameters, which are sent from the RVS to the landing guidance system; obtaining image data using a camera vision system of the area around the aircraft, the image data sent from the camera vision system to the landing guidance system; sending the selected vertiport location to the landing guidance system; calculating an optimal path to the selected vertiport location using the landing guidance system, based on the set of parameters from the RVS and the image data from the camera vision system; displaying the optimal path on the display system; and displaying a three-dimensional (3D) camera view from the camera vision system on the display system.

Example 13 includes the method of Example 12, wherein the landing guidance system sends the optimal path to an automatic flight control system (AFCS) on the aircraft, such that the AFCS follows the optimal path to perform an automatic landing of the aircraft at the selected vertiport location.

Example 14 includes the method of Examples 12, wherein the displayed optimal path and 3D camera view are used by a pilot to perform a manual landing of the aircraft at the selected vertiport location.

Example 15 includes the method of any of Examples 12-14, wherein the set of parameters from the RVS include location, altitude, depth, and velocity estimates.

Example 16 includes the method of any of Examples 12-15, wherein the set of parameters from the RVS are used by the landing guidance system to calculate an optimal flight path angle with respect to the selected vertiport location.

Example 17 includes the method of Example 16, wherein the optimal flight path angle is automatically calculated based on a standard flight path angle and a dynamic flight path angle.

Example 18 includes the method of Example 17, wherein: the standard flight path angle is calculated based on current location coordinates of the aircraft and on location coordinates of the selected vertiport location; and the dynamic flight path angle is calculated based on environmental conditions and on a configuration of the aircraft.

Example 19 includes the method of any of Examples 12-18, wherein the aircraft comprises a vertical takeoff and landing (VTOL) aircraft, or an urban air mobility (UAM) vehicle.

Example 20 includes a program product comprising: a non-transitory computer readable medium having instructions stored thereon, executable by a processer, to perform a method for landing guidance of an aircraft, the method comprising: receiving image data, in the processor, from a camera vision system onboard the aircraft, the image data corresponding to one or more terrain images over which the aircraft is traveling; receiving radar data comprising position, velocity and altitude data, in the processor, from a radar velocity system onboard the aircraft; receiving location coordinates of a vertiport, in the processor, from a vertiport location database onboard the aircraft; processing the image data and the radar data together, to determine a real time location of the aircraft, and provide three-dimensional imaging of a route to approach the vertiport; and calculating a landing flight path angle with respect to the vertiport when the aircraft approaches the vertiport, using current location coordinates of the aircraft and the location coordinates of the vertiport.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:
   a global navigation satellite system (GNSS) sensor onboard an aerial vehicle;
   a monitor warning system in operative communication with the GNSS sensor, the monitor warning system operative to determine whether the aerial vehicle is in a GNSS denied environment where GNSS signals are weak or lost, such that GNSS signal strength falls below a user selected threshold level;
   a flight management system onboard the aerial vehicle, the flight management system including at least one processor that hosts a landing guidance module, and a navigation database that includes location coordinates of one or more landing sites;
   one or more vision sensors mounted on the aerial vehicle and in operative communication with the landing guidance module;
   a radar velocity system (RVS) onboard the aerial vehicle and in operative communication with the landing guidance module, the RVS operative to obtain a set of parameters that comprise:

position, velocity and altitude data for the aerial vehicle; and depth mapping data and ground avoidance data for a surrounding environment; and an inertial navigation system onboard the aerial vehicle and in operative communication with the RVS;

wherein when the monitor warning system determines that the aerial vehicle is located in a GNSS denied environment, the landing guidance module is activated and is operative to calculate an optimal flight path by a process that comprises:

receive image data from the one or more vision sensors, the image data corresponding to one or more terrain images over which the aerial vehicle is traveling;

receive the position, velocity and altitude data for the aerial vehicle from the RVS and the inertial navigation system;

receive the depth mapping data and the ground avoidance data from the RVS;

receive location coordinates of a landing site selected by a user from the navigation database;

process the image data, the position, velocity and altitude data, and the depth mapping data, to determine a real time location of the aerial vehicle and provide three-dimensional (3D) imaging of a route to the landing site; and calculate a landing flight path angle with respect to the landing site when the aerial vehicle approaches the landing site, using current location coordinates of the aerial vehicle and the location coordinates of the landing site.

2. The system of claim 1, wherein the flight management system further includes a nearest landing site algorithm operative to provide an optimal landing site based on a state of the aerial vehicle and availability of landing locations.

3. The system of claim 1, wherein the landing guidance module is further operative to receive depth and velocity estimates from the RVS to calculate an optimal flight path angle.

4. The system of claim 3, wherein the landing guidance module is operative to send a guidance path based on the optimal flight path angle to an automatic flight control system (AFCS) on the aerial vehicle, wherein the AFCS is configured to follow the guidance path to perform a safe landing of the aerial vehicle at the landing site.

5. The system of claim 3, wherein the landing guidance module is operative to provide a guidance path based on the optimal flight path angle to a pilot of the aerial vehicle, such that the pilot can follow the guidance path to perform a safe landing of the aerial vehicle at the landing site.

6. The system of claim 1, wherein the one or more vision sensors include one or more infrared (IR) cameras.

7. The system of claim 1, further comprising a display system configured to receive multiple inputs, including a 3D camera view for providing accurate guidance and situational awareness to a pilot.

8. The system of claim 7, wherein the display system is configured to show a guidance path based on an optimal flight path angle calculated by the landing guidance module, and announce a message when the landing guidance module is activated.

9. The system of claim 1, wherein the aerial vehicle is a crewed aircraft.

10. The system of claim 1, wherein the aerial vehicle is an uncrewed aircraft.

11. The system of claim 1, wherein the aerial vehicle comprises a vertical takeoff and landing (VTOL) aircraft, or an urban air mobility (UAM) vehicle.

\* \* \* \* \*